United States Patent

[11] 3,548,931

| [72] | Inventors | John H. Germer;<br>Charles E. Boardman, San Jose, Calif. |
|---|---|---|
| [21] | Appl. No. | 771,796 |
| [22] | Filed | Oct. 30, 1968 |
| [45] | Patented | Dec. 22, 1970 |
| [73] | Assignee | The United States of America as represented by the United States Atomic Energy Commission |

[54] VESSEL FOR A SODIUM-COOLED REACTOR
10 Claims, 3 Drawing Figs.

[52] U.S. Cl. .................................................. 165/107,
176/87; 62/54; 220/9, 220/10
[51] Int. Cl. ...................................................... F28d 15/00
[50] Field of Search .......................................... 176/40, 87;
165/107; 62/54; 165/158; 220/9A, 10

[56] References Cited
UNITED STATES PATENTS

| 2,841,545 | 7/1958 | Zinn .............................. | 176/40 |
| 2,944,405 | 7/1960 | Basore et al. ................. | 62/54 |
| 3,110,156 | 11/1963 | Niemann ...................... | 220/9AX |

Primary Examiner—Reuben Epstein
Attorney—Roland A. Anderson

ABSTRACT: A vessel construction or arrangement for a sodium-cooled nuclear reactor which includes a sealing arrangement permitting leakage between the inert cover gas of a hot sodium tank and an insulated outer vessel; and a system for circulating and cooling the inert gas to prevent migration of sodium vapor to the cold surfaces of the outer vessel.

INVENTOR.
JOHN H. GERMER
CHARLES E. BOARDMAN
BY
ATTORNEY

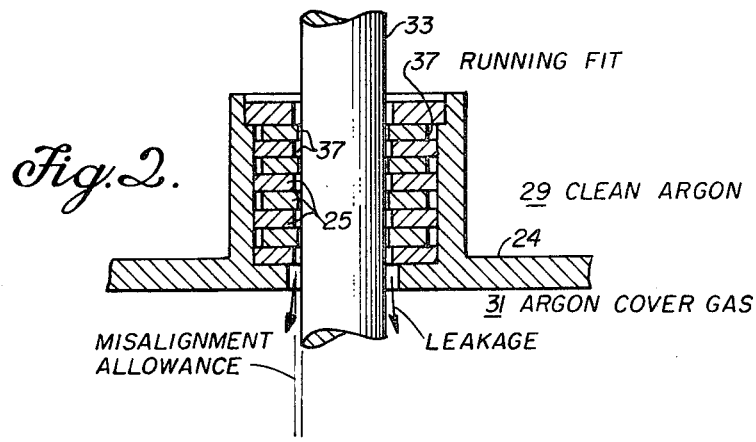
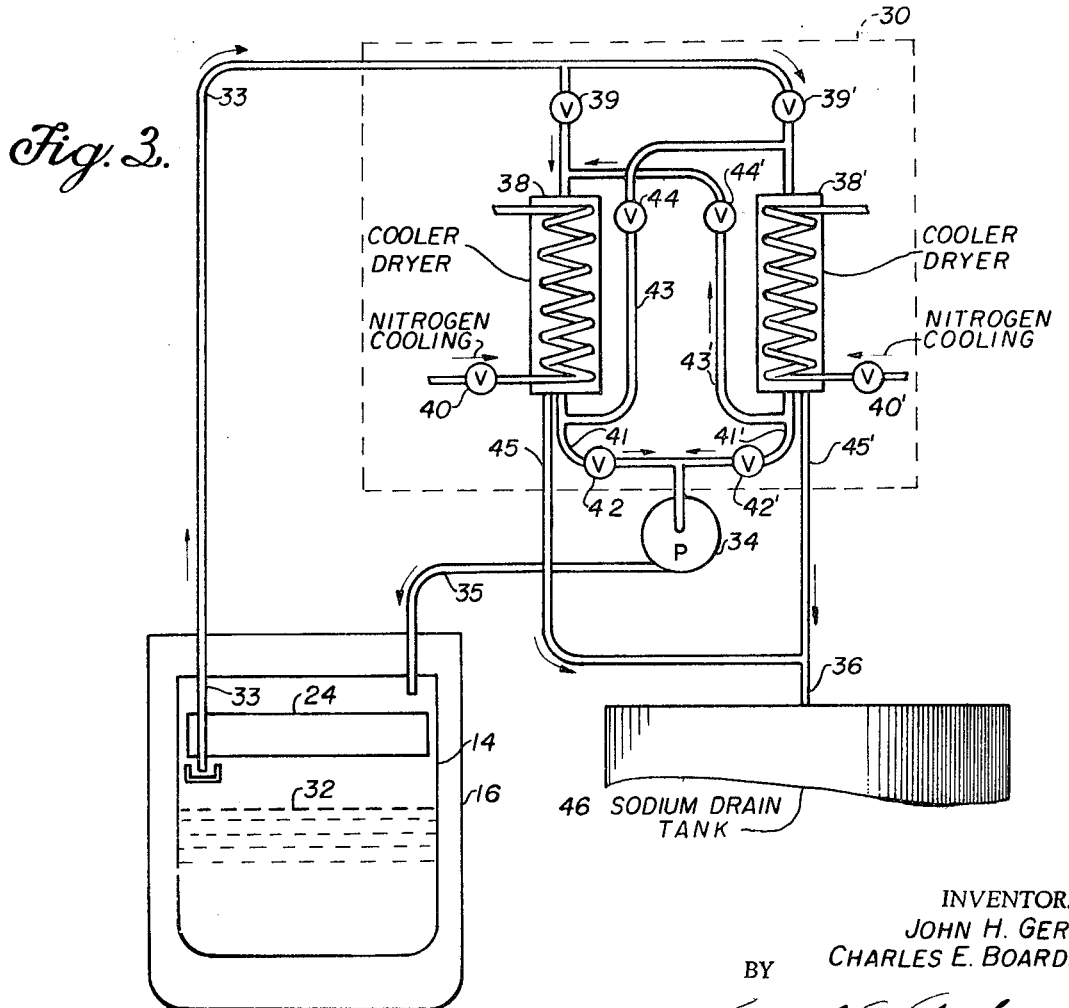

VESSEL FOR A SODIUM-COOLED REACTOR

BACKGROUND OF THE INVENTION

The invention described herein was made in the course of, or under, Subcontract 31-109-38-1997 under Contract No. W-31-109-ENG-1 with the United States Atomic Energy Commission.

A sodium-cooled fast reactor is a part of a primary coolant loop which also includes one or more circulating pumps and one or more heat exchangers. The primary coolant loop can be constructed with separate vessels for the components and with interconnecting piping. The alternative is to incorporate all of these components of the primary coolant loop within a single large vessel, and to interconnect them with ducts. Each of the components, including the reactor, is suspended in the vessel in a manner which permits access for repairs and refueling. This large vessel construction offers a considerable simplification over the piped system, and provides a considerable reduction in the possibility of sodium leakage One problem relating to the large vessel type of design is the accommodation of thermal expansion between the vessel and the individual components. For example, a typical vessel of 42 feet diameter constructed of stainless steel will expand about 3½ inches in diameter between room temperature and its normal operating temperature of about 800° F. The upper head of the vessel must normally be designed either so that the components are suspended off the head, or a sealed joint must be made at the component penetrations which permits a considerable lateral deflection. Either of these approaches is extremely difficult to accomplish in a very large reactor system because of the extreme size and weight of the components.

Another problem relating to sodium-cooled reactors is the sealing of the many penetrations, such as control rod drive shafts, which normally must penetrate the top of the reactor vessel. Unless the seal is operated at the temperature of the free surface of the sodium, natural convective currents will form and will not only cause overheating of the seal, but will cause sodium vapor to condense. If this temperature is above 208° F, this condensed sodium will freeze and make motion of the control rod drives difficult to achieve.

SUMMARY OF THE INVENTION

The above two mentioned problems have been solved by the present invention, which (1) eliminates the sealed vessel head and substitutes a sliding joint construction where some leakage is permitted at the joint; (2) the outer vessel is not subjected to severe thermal expansion; and (3) to prevent migration of sodium to the cold surfaces above and around the sides and bottom of the vessel, a recirculating cover gas system, including cooling and filter therefor, removes essentially all of the sodium vapor from the gas.

Therefore, it is an object of the invention to provide a large vessel reactor system which overcomes the problems of the prior known large vessel systems.

A further object of the invention is to provide a novel reactor vessel construction which includes a primary vessel and an insulated, sealed secondary vessel, the secondary vessel being operated at near room temperature.

Another object of the invention is to provide a reactor system vessel construction including an inner vessel containing sodium coolant and an outer vessel functioning as the primary containment.

Another object of the invention is to provide a reactor system vessel construction which includes sliding joint type seals about the areas of penetrations thereinto.

Another object of the invention is to provide a reactor system vessel construction which includes means for preventing the migration of sodium coolant to cold surfaces of the vessel.

Other objects and advantages of the invention will become readily apparent from the following description and accompanying drawings.

BRIEF DESCRIPTION OF THE DRAWINGS

FIG. 2 is an enlarged view of a seal utilized in the FIG. 1 vessel construction; and FIG. 3 schematically illustrates the cover gas circulating system of the FIG. 1 vessel construction for preventing the migration of sodium to cold surfaces of the vessel.

DESCRIPTION OF THE INVENTION

Figure 1:
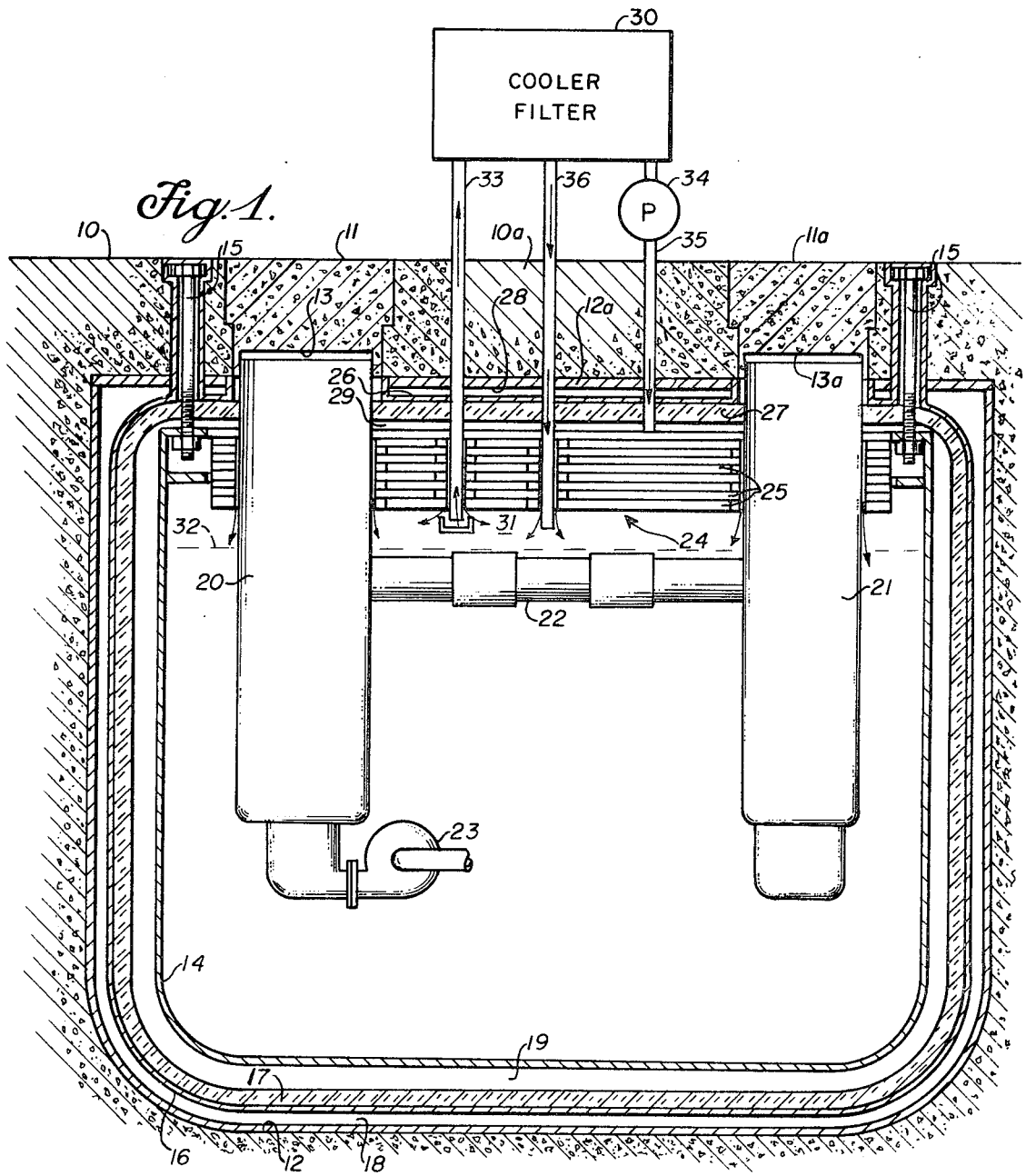
FIG. 1 is a view, partially in cross section, illustrating an embodiment of a portion of a nuclear reactor system incorporating the inventive vessel construction.

As pointed out above the present invention is directed to a nuclear reactor vessel construction wherein the reactor and one or more pumps and heat exchangers are suspended within the sodium-coolant tank and include means for permitting a leaky seal between the inert cover gas of the hot sodium tank and an insulated cold outer vessel; and additionally includes circulating the inert gas to prevent migration of sodium vapor to the cold surfaces of the outer vessel. This novel construction solves the problems of the prior known large tank type reactor systems pointed out herebefore by eliminating the sealed vessel head and substituting a sliding joint construction where some leakage is permitted at the penetrations. In addition the primary or sodium coolant containing vessel, which may, for example, be constructed of stainless steel, is surrounded by insulation and a sealed secondary vessel which is operated at near room temperature, thus only the primary vessel is subjected to severe thermal expansion, and because of the low temperature of the secondary vessel it may be, for example, constructed of carbon steel. Also, to prevent migration of sodium to the cold surfaces above and around the vessel, a recirculating cover gas (normally argon) system is utilized which includes a cooling heat exchanger and filter arrangement which removes from the high temperature cover gas essentially all of the sodium vapor and the gas is returned to a space outside of the sodium vessel from which it leaks back into the vessel through the sliding joint type seals, the sodium being returned to the sodium vessel.

Referring now to FIG. 1, an embodiment of the novel reactor vessel construction is illustrated.

As shown, a concrete containment 10 having a cavity therein and removable shield plugs 11 and 11a therefor are provided with liners 12, 13 and 13a respectively of suitable material as well known in the art. A primary vessel 14 or container of the open type is suspended within the cavity of containment 10 via bolts or rods 15 (only two being shown). An open top secondary vessel or container 16 is suspended in the cavity of containment 10 in spaced relationship with the primary vessel 14 and the liners 12, 13 and 13a. Adjacent the internal surface of the secondary vessel 16 is a layer of suitable insulation 17. Thus, a space 18 defining a nitrogen cooling space is formed intermediate the liner 12 and the secondary vessel 16 and a space 19 defining an argon gap is provided between primary vessel 14 and the insulation layer 17. Primary vessel 14 contains sodium or other suitable liquid-metal coolant and may be constructed of stainless steel; while the secondary vessel is insulated from high temperatures of the sodium coolant and may be constructed from carbon steel.

Suspended from the shield plugs 11 and 11a or by other means known in the art, not constituting part of this invention, is a nuclear reactor 20 having the normal core, fuel rods, control rods, etc. (not shown) and a heat exchanger 21. Reactor 20 and heat exchanger 21 are interconnected by expandable ducting 22 and supplied coolant by a sodium pump 23. If desired, the pump 23 can additionally be suspended directly from the shield 11. Also, a number of heat exchangers and pumps may be utilized. However, since the reactor, heat exchanger, pump and ducting do not constitute part of this invention, details thereof are deemed unnecessary. A bafflelike assembly 24 consisting of a plurality of sliding seal members or plates 25, described in greater detail hereinafter, serves to close the open end of primary vessel 14 and provide a leaky seal, as indicated by the arrows, about the various components of the reactor system, such as reactor 20 and heat exchanger 21, extending therefrom. To provide, in effect, a continuation of the cooling arrangement of the nitrogen cooling space 18, the argon space or gap 19, and the secondary vessel 16 above the top of the primary vessel 14, the shield plugs 11 and 11a and the liner 12a of structure 10a therebetween are each provided with a spaced member 26, of the same material as secondary vessel 16, having a layer of insulation 27 thereon to define a nitrogen cooling space 28 between liner 13 and member 26 and an argon gap 29 between insulation 27 and baffle assembly 24.

Mounted above and intermediate shield plugs 11 and 11a is an argon cooler and filter assembly 30, shown in greater detail in FIG. 3, and connected with a cover gas space 31 above the sodium level 32 containing argon, via a vent tube assembly 33 for removing reactor cover gas at high temperature from space 31 for cooling and filtering thereof which removes essentially all of the sodium vapor from the gas. The gas is then returned to the space or gap 29 above the baffle assembly 24, via pump or circulator means 34 and conduit 35, from which it leaks back into the vessel 14 through the plates 25 of baffle assembly 24. The sodium vapor removed from the cover gas in assembly 30 is drained into the primary vessel 14 via conduit 36 or to a sodium drain tank, as described in greater detail hereinafter. The capacity of the gas system is sufficient to prevent hot upward convective currents through the many penetration leaks in baffle assembly 24. The insulation 17 between the low temperature or secondary vessel 16 and the sodium or primary vessel 14 is thus not exposed to sodium vapor which would otherwise rapidly destroy its insulation capability.

The maintenance of a low temperature in the outer or secondary vessel 16 requires that it be cooled. This can be accomplished by circulating cool nitrogen by means not shown in the space 18 between the outer vessel 16 and the liner 12 and in the space 28 between the material 26 and the liners 13 and 13a of shield plugs 11 and 11a, spaces 18 and 28 forming, in effect, a continuous space about secondary vessel 16. Alternatively, another fluid such as liquid sodium-potassium alloy could be circulated through the spaces 18 and 28.

One detail not shown in FIG. 1 is the control of the cover gas above the outlet of reactor 20 and above the inlet of heat exchanger 21. Since these pressures are somewhat higher than the pressures of the cover gas above the rest of the sodium level 32 in the vessel 14, they would be separately controlled in a manner similar to that of the main cover gas in space 31. Various degrees of interconnection not constituting part of this invention would be possible and are known in the art.

Vent tube assembly 33 and sodium drain conduit 36, as well as reactor 20 and heat exchanger 21 or any other elements which penetrate baffle assembly 24 are fitted with sliding seals or slip joints of the type illustrated in FIG. 2 to provide a leaky seal which allows the cover gas from space or gap 29 and 19 to leak back into space 31 above the sodium level 32, spaces or gaps 29 forming, in effect, a continuous space about primary vessel 14. The baffle assembly 24 contains numerous partially overlapping horizontal plates 25, a portion of which form a running fit as indicated at 37 with the vent tube 33, for example, such that a small amount of leakage, as indicated by the arrows and legend, is permitted therebetween. The arrangement of the plates 25 provides a misalignment allowance, indicated by the legend, between the baffle assembly 24 and the tube 33 or other penetration therethrough caused by thermal expansion between the individual components of the reactor system as discussed hereinbefore, such that the outer or secondary vessel 16 is not subjected to these thermal expansion conditions.

Referring now to FIG. 3, a schematic diagram of the argon gas circulating system of the FIG. 1 vessel embodiment is illustrated. The main purpose of this circulating system, as discussed above, is to allow leaky slip joints (see FIG. 2) and to stop sodium vapor from condensing on the cooler upper portions of reactor vessel construction. To accomplish this, two things must be satisfied: (1) The circulating gas must be kept flowing downward past the slip joints and baffles, and (2) the recirculated argon which is reintroduced above the baffles and slip joints must be free from sodium vapor. The circulating system 30 shown in FIG. 3 is of a dual type which is composed of a pair of heat exchangers or cooler-dryer units 38 and 38' respectively connected to the vent tube assembly 33 by valves 39 and 39'. Nitrogen for cooling the units 38 and 38' is circulated in counterflow relation to the flow of the cover gas and is controlled by valves 40 and 40'. Each of units 38 and 38' is respectively provided with gas outlets 41 and 41' which direct the cooled gas to pump or circulator means 34 via valves 42 and 42'. Taps or lines 43 and 43' connect outlets 41 and 41' with the inlets of units 38' and 38, respectively, via valves 44 and 44'. Sodium drain lines 45 and 45' connect units 38 and 38' with the sodium drain conduit 36 which returns the sodium to the primary vessel 14 in FIG. 1 or to a sodium drain tank 46 as shown in FIG. 3.

The circulating system for the cover gas shown in FIG. 3 will assure almost complete removal of sodium vapor by cooling the circulating gas well below the freezing point of sodium (208° F). The cooler-dryer units 38 and 38' may be multipass units with the sodium drain lines 45 and 45' and the dryer sections thereof in the passes ahead of the section where the surfaces are below the freezing point of sodium. In the remaining downstream section of the heat exchangers (units 38 and 38') most of the remaining sodium vapor would be condensed and would plate out on the tube surfaces. After a period of time the effectiveness of the one cooler would be reduced due to the deposition of the sodium on the tubes. To defrost the one unit the cooling fluid (nitrogen) would be stopped, causing the whole unit to heat up to the inlet temperature of the cover gas (about 800° F). The gas would then be passed in series through the other unit for cooling and drying of the cover gas. During this heat-up process the deposited sodium would melt and drain to the primary sodium vessel or to the sodium drain tank. By using the arrangement of FIG. 3, one unit, for example 38, could be defrosting while the other unit 38' carries the cooling and drying duty. Reversing the valve positions would defrost the unit 38' and load the unit 38. Both units can be operated in parallel when the defrosting operation is not being performed or to assure continuity when switching between units by appropriate actuation valves 39–39', 42–42' and 44–44'.

Also, while not shown, means may be provided for preventing liquid sodium condensate formed on the top or upper portion of the heat exchanger units from dropping onto the lower freezing section of multiple-pass units. This can be accomplished by baffle plates, or by orienting the heat exchanger at an angle or horizontally, and with the liquid sodium drain at a suitable location.

It has thus been shown that the present invention overcomes the problems of the prior art large vessel reactor system by providing a unique vessel construction incorporating sliding joints or seals for elements extending from the sodium containing vessel and a recirculating cover gas system which prevents migration of sodium to the cold surfaces of the reactor vessel arrangement.

Although a particular embodiment of the invention has been illustrated and described, modifications and changes will become apparent to those skilled in the art, and it is intended to cover in the appended claims all such modifications as come within the spirit and scope of the invention.

We claim:

1. A vessel system for a sodium-cooled nuclear reactor comprising: a primary vessel constructed to contain sodium coolant; a secondary vessel external of and in spaced relation with said primary vessel; insulation means intermediate said primary and secondary vessels; said primary vessel being in spaced relationship with said insulation means to define a gap therebetween; said primary being of the open top type and provided with baffle assembly means thereacross, said baffle assembly means being constructed so as to provide a leaky type seal about associated elements extending therethrough, said baffle assembly means being positioned in said primary vessel so as to provide a cover gas space defined between said baffle assembly means and associated sodium coolant within said primary vessel; and means for removing associated cover gas from said cover gas space, removing any sodium vapor from associated cover gas, returning associated cover gas to said gap for leakage of same through said baffle assembly means into said cover gas space, and draining therefrom sodium removed from associated cover gas.

2. The vessel system defined in claim 1, wherein said secondary vessel is mounted in a containment and in spaced relationship therewith to define a cooling space therebetween.

3. The vessel system defined in claim 1, wherein said primary and secondary vessels are suspended with a concrete containment having a removable shield portion for providing access to said vessels, said containment and said shield each being provided with a liner means therefor, said liner means being in spaced relation with said secondary vessel defining a cooling space therebetween.

4. The vessel system defined in claim 3, wherein said shield portion of said concrete containment is provided with a layer of material in spaced relationship therewith to provide a continuation of said cooling space and said secondary vessel, layer of material being provided with insulation means on the side thereof opposite said cooling space, said insulation means being in spaced relationship with said baffle assembly means defining said gap.

5. The vessel system defined in claim 1 wherein said leaky type seal is constructed of a plurality of overlapping platelike members, certain of said platelike members forming a leaky fit with respect to associated elements extending therethrough, said platelike members being overlapped in a sliding arrangement to provide for misalignment movement of associated elements extending therethrough.

6. The vessel system defined in claim 1, wherein said cover gas removal means includes a cooler-dryer assembly, a vent tube means extending through said baffle assembly means and connecting said cooler-dryer assembly with said cover gas space, a circulator means connected to said cooler-dryer assembly and to a conduit means terminating in said gap, and sodium drain conduit means connected to said cooler-dryer assembly.

7. The vessel system defined in claim 6, wherein said sodium drain conduit means extends through said baffle assembly means for draining sodium from said cooler-dryer assembly into said primary vessel.

8. The vessel system defined in claim 6, wherein said cooler-dryer assembly includes at least a pair of cooler-dryer units, valve means for selectively connecting inlets of said units to said vent tube means, valving means for selectively connecting outlets of said units to said circulator means, means for selectively cooling said units, and drain lines connecting said units with said sodium drain conduit means.

9. The vessel system defined in claim 8, additionally including means for selectively connecting said pair of cooler-dryer units in parallel.

10. The vessel system defined in claim 9, wherein said primary vessel contains sodium coolant, said cover gas space and said gap contain argon gas, and said cooling space contains nitrogen.